(12) United States Patent
Anker et al.

(10) Patent No.: US 8,481,638 B2
(45) Date of Patent: Jul. 9, 2013

(54) HIGH TEMPERATURE PP ADHESIVE

(75) Inventors: Martin Anker, Hisings Kärra (SE); Leif Leiden, Anttila (FI); Kauno Alastalo, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 96 days.

(21) Appl. No.: 12/445,135

(22) PCT Filed: Oct. 12, 2007

(86) PCT No.: PCT/EP2007/008901
§ 371 (c)(1),
(2), (4) Date: Mar. 8, 2010

(87) PCT Pub. No.: WO2008/043569
PCT Pub. Date: Apr. 17, 2008

(65) Prior Publication Data
US 2010/0168324 A1  Jul. 1, 2010

(30) Foreign Application Priority Data
Oct. 13, 2006  (EP) .................................. 06021510

(51) Int. Cl.
*A61K 9/16* (2006.01)
*C08L 23/12* (2006.01)

(52) U.S. Cl.
USPC .......................................... 524/543; 524/582

(58) Field of Classification Search
USPC ........................................................... 524/543
See application file for complete search history.

(56) References Cited

U.S. PATENT DOCUMENTS

| | | | | |
|---|---|---|---|---|
| 5,041,338 A * | 8/1991 | Suehiro et al. | ................. | 428/516 |
| 6,143,825 A * | 11/2000 | Beren et al. | ..................... | 525/70 |
| 6,486,246 B1 * | 11/2002 | Vion | .............................. | 524/271 |
| 2005/0053741 A1 | 3/2005 | Ebner et al. | ................ | 428/36.91 |
| 2010/0029829 A9 * | 2/2010 | Jiang et al. | ..................... | 524/487 |
| 2010/0151172 A1 | 6/2010 | Emig et al. | .................. | 428/36.9 |

FOREIGN PATENT DOCUMENTS

| | | |
|---|---|---|
| EP | 0 353 613 A2 | 2/1990 |
| EP | 0 372 875 A1 | 6/1990 |
| EP | 1 316 598 A1 | 6/2003 |
| EP | 1 344 793 | 9/2003 |
| EP | 1 382 638 | 1/2004 |
| WO | WO 99/40160 A1 | 8/1999 |
| WO | WO 01/77224 A1 | 10/2001 |
| WO | 03/042260 | 5/2003 |
| WO | WO 2005/105941 A1 | 11/2005 |

* cited by examiner

*Primary Examiner* — Hui Chin
(74) *Attorney, Agent, or Firm* — Seed IP Law Group PLLC

(57) ABSTRACT

The present invention relates to an adhesive composition providing high peel strength in particular at high temperatures, an article comprising a layer of the adhesive and the use of the adhesive.

9 Claims, No Drawings

HIGH TEMPERATURE PP ADHESIVE

The present invention relates to an adhesive composition providing high peel strength in particular at high temperatures, an article comprising a layer of the adhesive and the use of the adhesive.

RELATED ART

Multilayer structures, comprising two, three, four or more different layers are known for many applications such as the protective coatings for pipes. In these multilayer structures different layers most often consist of different materials, which accordingly have different physical and chemical properties. These results in the problem that adjacent layers do not or only to an insufficient extend adhere to each other. Therefore it is known to build up multilayer structures using intermediate adhesive layers for improving the adhesion of adjacent layers of different materials and thus avoid delamination.

One example of multilayer structures are the polymer coatings of pipes such as pipes used for transporting natural gas, crude oil as well as products derived there from. Such coating usually comprises three layers which are applied onto the outer surface of a pipe. A typical example comprises a first coat of an epoxy primer on the metal surface of the pipe. Over this primer layer an adhesive composition is provided, enabling a sufficient binding to the outer polyolefin layer, typically a high-density polyethylene or polypropylene. While the epoxy layer shows a good adhesion to the metal surface of the pipe, enabling the desired protection, the adherence with the outer protective polyolefin layer is not sufficient, so that an adhesive layer is necessary.

Adhesive layers as well as suitable composition therefore are known from the prior art. WO 99/37730 for example discloses an adhesive composition comprising an ethylene copolymer component together with 2 to 35-wt % of a grafted metallocene polyethylene. EP 1 316 598 A1 discloses another example of an adhesive composition, in particular suitable for the above illustrated pipe application, based on a polyethylene component. The adhesive composition disclosed in EP 1 316 598 A1 comprises a non-elastomeric polyethylene blended with an elastomer, preferable an ethylene based elastomer. Concerning the obtainable peel strength EP 1 316 598 A1 discloses values of about 400 N/cm or more at 23° C., measured in accordance with DIN 30 670. In comparison with a reference example containing no metallocene based polyethylene the adhesive compositions according to EP 1 316 598 A1 display an improved peel strength at higher temperatures, i.e. of about 130 N/cm at 85° C., compared with only 48 N/cm for the reference example.

U.S. Pat. No. 4,606,953 discloses a polypropylene coated steel pipe, comprising an adhesive layer consisting of a mixture of an unsaturated carboxylic acid modified crystalline polypropylene, an unmodified crystalline polypropylene and a polyolefin rubber. EP 777 693 discloses a polypropylene composition having an acid value of greater than 4.5.

However, the requirements for onshore as well as offshore applications, in particular for coated pipes, put more and more emphasize on higher operational temperatures, so that a further improvement particular of the adhesive composition at high temperatures is required, in order to minimize the risk of delamination of coatings provided on pipes etc.

Finally, there are various documents describing polyolefin based adhesives, such as WO 2005/105941, EP 0372875 A2, WO 99/40160 and EP 0353661 A2. These documents disclose as possible uses for the polyolefin adhesives as described the following: improving bonding to polar as well as non-polar substrates; suitability for use as a glue in tufted or needle-punched carpet, wherein the fibers of the carpet are fixed to the primary carpet backing by the adhesive; improving the adhesion between a polypropylene resin layer and an ethylene vinyl alcohol polymer layer or a polyamide resin layer; and use of the adhesive to heat seal a polypropylene container.

None of the documents refer to the use of adhesive compositions in multilayer structures used as polymer coatings of pipes and none of the documents discloses high peel strength values at high temperatures. EP 0372875 discloses in this respect adhesive compositions having decreasing peel strength at increasing temperatures, with overall values for peel strength far below than required for high temperature applications, such as onshore as well as offshore applications of coated pipes.

OBJECT OF THE PRESENT INVENTION

Accordingly it is the object of the present invention to provide an adhesive composition providing improved adhesion at high temperatures. In particular the adhesive should be applicable to be used in pipe applications illustrated above and should preferably provide an increase of peel strength at high operational temperatures, compared with the prior art adhesive compositions.

BRIEF DESCRIPTION OF THE INVENTION

This object has been solved with the adhesive composition as defined in claim 1. Preferred embodiments are outlined in the subclaims 2 to 8 as well as in the following description. The present invention further more provides an article comprising the adhesive composition as well as the use of the adhesive composition as defined in claims 9 and 10. Preferred embodiments are defined in the following.

DETAILED DESCRIPTION OF THE INVENTION

As defined in the claim the adhesive composition displays an improved value for peel strength, determined as defined herein, at high temperatures, in particular a peel strength of more than 400 N/cm at 23° C. and of more than 160 N/cm at 110° C. In particular embodiments the adhesive composition displays a peel strength of more than 90 N/cm at 140° C.

The adhesive composition as defined in the present invention has a melt flow rate ($MFR_2$; 230° C.; load 2.16 kg; ISO 1133; g/10 min) of equal to or greater than 5, in particular from 5 to 10, more preferably from 6 to 8 and in particular about 7 to 7.5. The density (ISO 1183) preferably is about 0.9 $g/cm^3$, such as from 0.890 to 0.910 $g/cm^3$. The adhesive composition furthermore shows a Vicat softening temperature (A/50; 10N; ISO 306) of from 130 to 160° C., preferably 140 to 150° C. The acid number of the adhesive composition preferably is below 2, more preferably below 1, and in particular from 0.5 to 0.9 (mg KOH required per g of sample for neutralization).

The adhesive composition of the present invention comprises, contrary to the prior art disclosure a polypropylene component as the base polymer. Preferably the adhesive composition of the present invention does not comprise any further polymeric components, in particular not polyethylene, including LLDPE, LDPE and HDPE. The polypropylene component to be employed in accordance with the present invention comprises at least one heterophasic propylene copolymer.

Preferably the adhesive composition according to the present invention comprises only heterophasic propylene copolymers as polymeric components (i.e. one, two, three or even more heterophasic propylene copolymers but no other polymeric components).

The term "heterophasic propylene copolymer" as employed in the present application defines a copolymer comprising a matrix phase and a dispersed phase. The matrix phase usually comprises from about 75 to 95-wt % of the heterophasic propylene copolymer while the dispersed phase amounts to 5 to 25-wt % of the heterophasic propylene copolymer. The heterophasic propylene copolymer to be employed in accordance with the present invention may be any suitable and conventional heterophasic propylene copolymer known to the skilled person. The skilled person is readily aware of how such bimodal or multimodal propylene copolymer components can be obtained, for example by mechanical blending including mixing and melt blending processes and any combinations thereof as well as in-situ blending during the polymerisation process of the propylene polymer component(s), or any combination of mechanical and in-situ blending.

Such heterophasic propylene copolymers may be prepared in any known manner, including sequential polymerization reactions, wherein the components are blended together in-situ during their preparation process, the above mentioned mechanical blending processes as well as a combination of in-situ blending and mechanical blending. Sequential polymerisation reactions are preferred for preparing the heterophasic propylene copolymer to be employed in the present invention.

The modality of the matrix phase with respect to molecular weight distribution and thus with respect to flow rate ratio (FRR) is not critical. Thus the polypropylene matrix phase in accordance with the present invention may be unimodal or multimodal including bimodal with respect to molecular weight distribution. The polypropylene matrix phase of the invention may also be multimodal with respect to comonomer distribution.

The heterophasic propylene copolymer to be employed in accordance with the present invention may thus comprise a matrix phase comprising only one propylene polymer component or the matrix phase may comprise more than one propylene polymer, such as two, three or four different propylene polymers. In preferred embodiments, the matrix phase comprises at least two propylene polymer components.

The matrix phase usually comprises at least one propylene homopolymer or a propylene copolymer and/or a further propylene homopolymer or copolymer. Preferably, the matrix phase comprises at least two propylene polymer components, preferably either (i) a propylene homopolymer or a propylene random copolymer in combination with (ii) a propylene homopolymer. The preferred embodiment, if a mixture of propylene polymer components is employed, uses two or more, as outlined above, propylene homopolymer components. The propylene polymer components for the matrix phase may be combined in any suitable manner, preferably, by preparing the matrix phase as in-situ reactor blend, i.e. by preparing the different components of the matrix phase during subsequent polymerization steps in suitable reactor arrangements. Alternatively, the matrix phase may be combined by mechanical (melt) blending different propylene polymer components.

Likewise, the dispersed phase, i.e. the elastomeric rubber phase, may comprise one suitable elastomeric copolymer or more than one, such as two, three or four. In preferred embodiments, the heterophasic propylene copolymer to be employed in accordance with the present invention comprises a dispersed phase comprising one elastomeric rubbery polymer phase. Suitable and preferred embodiments of the heterophasic propylene copolymer are discussed in the following.

The matrix phase of the heterophasic propylene copolymer to be used in accordance with the present invention furthermore is characterized in that it comprises up to 5-wt % of ethylene and/or at least one $C_4$-$C_8$ α-olefin. In embodiments, the matrix phase of the heterophasic propylene copolymer comprises 0 to 5 weight % (wt %) of ethylene and/or at least one $C_4$-$C_8$ α-olefin, preferably 0 to 2-wt % of ethylene.

The matrix phase of the heterophasic propylene copolymer may be unimodal or multimodal, i.e. the different components of the matrix phase may either show similar molecular weight distributions or different molecular weight distributions (and accordingly also $MFR_2$ values). Herein the term "multimodal" includes bimodal molecular weight distribution. It is preferred when the matrix phase of the heterophasic propylene copolymer has at least bimodal molecular weight distribution. Such a preferred embodiment can be realized by providing a matrix phase having a broad molecular weight distribution and comprising at least two propylene polymer components (i) and (ii) with different weight average molecular weights (Mw) and, thus, with different melt flow ratios ($MFR_2$). Such an embodiment may be exemplified by a mixture of a lower molecular weight component with a higher molecular weight component. The lower molecular weight (LMW) component has a higher $MFR_2$ than the higher molecular weight (HMW) component. In embodiments, the LMW component is at least one component (i) while the HMW component is at least one component (ii). As outlined above, it is preferred when the matrix phase of the heterophasic propylene copolymer is bimodal, comprising a LMW component and a HMW component. The amount of the LMW component is typically between 30 to 70-wt %, preferably 40 to 60-wt % of the total amount of the matrix phase. The amount of the HMW component is typically between 30 to 70-wt %, preferably 40 to 60-wt % of the total amount of the matrix phase.

In embodiments, the ratio ($MFR_2$ of LMW component) to ($MFR_2$ of HMW component) is typically at least 3, preferably at least 4, more preferably at least 10, and in some end applications even at least 15 is desired. The upper limit of said ratio may be up to 200, preferably up to 100.

The matrix phase in accordance with the present invention preferably shows an $MFR_2$ of from 0.5 to 50, such as from 1 to 30 and in embodiments from 5 to 20. Preferred embodiments are also $MRF_2$ values of from 1 to 7.

The heterophasic propylene copolymer to be employed in accordance with the present invention furthermore comprises a dispersed elastomeric rubber phase. This dispersed phase (rubber phase) makes up to 25-wt % of the total weight of the heterophasic propylene copolymer. Suitable ranges are 5 to 25-wt % and in embodiments also 10 to 15-wt %.

The dispersed phase comprises an elastomeric copolymer of propylene and one or more olefin comonomer, comprising from 20 to 80-wt % of olefin comonomer. The olefin comonomer is preferably ethylene and/or $C_4$-$C_8$ α-olefin. Suitable amounts of ethylene or $C_4$-$C_8$ α-olefin in the elastomeric propylene copolymer are accordingly 20 to 80-wt %, 25 to 50-wt % or 30 to 40-wt % of ethylene or $C_4$-$C_8$ α-olefin, or any mixture thereof. Preferably the comonomer is ethylene. The dispersed phase includes also terpolymers of propylene and two different olefin comonomers, such as with ethylene and a $C_4$-$C_8$ α-olefin. In case of two or more comonomers the total amount of comonomer is preferably as given above for individual comonomers.

According to a preferred embodiment of the present invention, the dispersed phase, i.e. the ethylene rubber copolymer is an ethylene propylene rubber (EPR). EPR materials are more cost-effective than rubbers with higher α-olefins and they can either be synthesized in a final step of a multi-step process, where the first steps synthesize the matrix polymer, or they can be mechanically blended with the matrix polymer in a separate melt blending step.

The final comonomer content, preferably ethylene content, of the heterophasic propylene copolymer as employed in accordance with the present invention typically amounts to from 5 to 15-wt %, preferably about 7 to 10-wt %. The use of such a heterophasic propylene copolymer enables the preparation of adhesive compositions in accordance with the present invention, displaying a peel strength at 110° C. of more than 160 N/cm and a value for $MFR_2$ of 5 g/10 min or more. Preferably the MFR value is from 5 to 10 g/10min and the peel strength at 110° C. preferably is greater than 170 N/cm, more preferably more than 180 N/cm and most preferably more than 190 N/cm. Preferably the adhesive composition in accordance with the present invention displays a peel strength of more than 90 N/cm at 140° C., more preferably more than 100 N/cm.

As outlined above, the heterophasic propylene copolymer to be employed in accordance with the present invention may be prepared in any suitable manner known to the skilled person in the art, including mechanical blending processes as well as, preferably, sequential polymerization processes. In this respect, it is also possible to prepare the matrix phase by suitable sequential polymerization processes, while the dispersed phase then can either be introduced by blending processes or by a further polymerization carried out in the presence of the already polymerized matrix phase.

According to a preferred embodiment of the present invention, the heterophasic propylene copolymer is a reactor made heterophasic propylene polymer. Reactor made heterophasic propylene copolymer means herein a reaction product which is obtained from a polymerization reaction sequentially polymerizing the different components of the heterophasic propylene copolymer. In this respect, any polymerization method, including solution, slurry and bulk polymerization or gas phase polymerization can be used, in any desired order. Bulk polymerization defines in the present application a polymerization in a reaction medium comprising at least 60-wt % monomer.

In the following, a preferred process for preparing first the matrix phase of the heterophasic propylene copolymer is described, followed by a description of a further preferred embodiment also including the preparation of the dispersed phase.

When the matrix is unimodal with respect to the molecular weight distribution and comonomer distribution, it is prepared in a single stage process e.g. as slurry or gas phase process in a slurry or gas phase reactor. Preferably, the unimodal matrix is polymerised as a slurry polymerisation.

The matrix phase of the heterophasic propylene copolymer to be used in accordance with the present invention, comprises preferably components (i) and (ii) as defined above may be prepared by polymerizing, in a slurry reactor, for example a loop reactor, propylene monomers optionally together with one or more comonomers, in the presence of a polymerization catalyst to produce component (i) of the matrix phase of the heterophasic propylene copolymer. This component (i) is then transferred to a subsequent gas phase reactor, wherein in the gas phase reactor propylene monomers are reacted optionally in the presence of suitably selected comonomers in order to produce component (ii) in the presence of the reaction product of the first step. This reaction sequence provides a reactor blend of components (i) and (ii) constituting the matrix phase of the heterophasic propylene copolymer. It is furthermore also possible to reverse the order of producing components (i) and (ii), which has been described above in the order of first producing component (i) and then producing component (ii). The above-discussed process, comprising at least two polymerization steps, is advantageous in view of the fact that it provides easily controllable reaction steps enabling the preparation of a desired reactor blend of the matrix phase of the heterophasic propylene copolymer. The polymerization steps may be adjusted, for example by appropriately selecting monomer feed, comonomer feed, hydrogen feed, temperature and pressure in order to suitably adjust the properties of the polymerization products obtained. It is in particular possible to obtain the preferred multimodality, preferably the bimodality, of the matrix phase of the heterophasic propylene copolymer, with respect to the ethylene distribution as well as with respect to the molecular weights and $MFR_2$ values of the matrix phase components during said multistage polymerization procedures.

Such a process can be carried out using any suitable catalyst for the preparation of propylene monomers, including single site catalyst, including metallocenes and non-metallocenes, and Ziegler-Natta. Preferably, the process as discussed above is carried out using a Ziegler-Natta catalyst. A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl biased compound. Suitable catalysts are in particular disclosed in U.S. Pat. No. 5,234,879, WO 92/19653, WO 92/19658 and WO 99/33843, incorporated herein by reference.

Preferred external donors are the known silane-based donors, such as dicyclopentyl dimethoxy silane or cyclohexyl methyldimethoxy silane.

The properties of the matrix phase produced with the above-outlined process may be adjusted and controlled with the process conditions as known to the skilled person, for example by one or more of the following process parameters: temperature, hydrogen feed, comonomer feed, propylene feed, catalyst, type and amount of external donor, split between two or more components of a multimodal polymer.

In accordance with a further preferred embodiment of the present invention, the matrix phase produced in accordance with the preferred process discussed above is then transferred into a further reactor, preferably a gas phase reactor in order to polymerize an elastomeric propylene copolymer component, i.e. the dispersed phase, in the presence of the matrix phase.

A reactor blend comprising the matrix phase and the dispersed phase obtained with such a multistage polymerization process, preferably comprising a first slurry polymerization followed by at least two gas phase polymerization, is a preferred heterophasic propylene copolymer to be employed in accordance with the present invention. The process, e.g. comonomer content and MFR, are controlled in a known manner.

As outlined above, the polypropylene component of the adhesive composition of the present invention comprises a heterophasic propylene copolymer. A suitable heterophasic propylene copolymer has an MFR$_2$ (determined as outlined above) of from 2 to 10, in particular 2 to 5 g/10 min.

However, as outlined above it is also envisaged by the present invention to employ also mixtures/blends of different heterophasic propylene copolymers, an option of particular advantage for the acid modification discussed below. In one particular preferred embodiment of the present invention the adhesive composition comprises in addition to a first heterophasic propylene copolymer (such as defined above) a second heterophasic propylene copolymer as second polymeric component of the polypropylene component. As outlined above, it is in particular preferred in accordance with the present invention when no other polymeric components are present, in particular no polyethylene components. The second heterophasic propylene copolymer preferably has a lower ethylene content and also a lower MFR$_2$ compared to the first heterophasic propylene copolymer.

In this embodiment the first heterophasic propylene copolymer amounts to from 50 to 85-wt %, based on the total weight of the adhesive composition, whereas the second heterophasic propylene copolymer amounts to from 15 to 50-wt % of the adhesive composition. More preferably the respective amounts are 70 to 82-wt % and 18 to 30-wt %, more preferably 75 to 80-wt % and 25 to 20-wt %.

Typically the polypropylene component is modified, at least partially with an acid grafting agent, in order to improve the adhesive properties. Typical examples of such grafting agents are unsaturated carboxylic acids or derivatives thereof, such as anhydrides, esters and salts. Preferably the unsaturated group is in conjugation with the carboxylic group. Examples thereof are acrylic acid, methacrylic acid, fumaric acid, maleic acid, nadic acid, citraconic acid, itaconic acid, crotonic acid, and their anhydrides, salts (metallic and non-metallic), esters amides and imides. In particular preferred are maleic acid and derivatives, in particular the anhydride.

Grafting may be carried out by suitable processes known to the skilled person. The amount of grafting agent is preferably as low as possible and as high as required for the desired degree of adhesive properties of the adhesive composition. The acid grafting agent accordingly is typically employed in amounts of from 0.5 to 3-wt %, based on the weight of the heterophasic propylene copolymer to be subjected to acid grafting. Typical amounts are in particular from 0.5 to 1.5-wt % and, using maleic acid anhydride as reference acid grafting agent the typical amount is about 0.5 to 1.2-wt %, in particular less than 1-wt %, in embodiments 0.7-wt %. This is a far lower amount of acid grafting agent as conventionally required.

Surprisingly it has been found that for adhesive compositions in accordance with the present invention the amount of acid grafting agent may be less than required in the prior art for similar adhesive properties, due to the use of the heterophasic propylene copolymer (either alone or as a mixture of different heterophasic propylene copolymers) as base component (i.e. the polymer component).

In accordance with the present invention, in particular when using blends of heterophasic propylene copolymers for the polypropylene component, it is not required that each heterophasic propylene copolymer component has been subjected to a graft modification with the acid grafting agent. In particular when using the preferred embodiment illustrated above, i.e. the mixture of the two heterophasic propylene copolymers, it is sufficient, and in particular also more efficient, when only the second heterophasic propylene copolymer has been subjected to the modification with the acid grafting agent. Accordingly only the minor (concerning the amount) component of the polypropylene component of the adhesive composition has to be subjected to the modification. This facilitates the process for preparing the adhesive composition of the present invention and reduces also the amount of grafting agent required.

In such an embodiment the total amount of acid grafting agent calculated with respect to the weight of the total composition is even lower than outlined above. The examples as contained herein illustrate that in accordance with the present invention the amount of acid grafting agent, calculated on the total weight of the adhesive composition, may be as low as about 0.1-wt %. Even such a low amount still enables the preparation of a highly satisfactory high temperature PP adhesive. Suitable amounts are 0.01 to 3, more preferably 0.03 to 1.5 parts by weight, based on the overall adhesive composition, and in embodiments also 0.05 to 1, or also 0.075 to 0.5.

Accordingly, the adhesive composition in accordance with the present invention preferably has a low acid number, preferably of below 1.

The adhesive composition in accordance with the present invention may furthermore comprise additional, conventional components (additives), such as stabilizers, in usual amounts. The type and amount of such additives can be selected by the skilled person on the basis of the general knowledge in the art. Typically these additive do not amount to more than 2 wt.-% (in total), based on the adhesive composition.

A particular preferred embodiment of the present invention accordingly is an adhesive composition comprising a first heterophasic propylene copolymer as defined above and a second heterophasic propylene copolymer as defined above, wherein the second heterophasic propylene copolymer has been subjected to acid grafting, in particular with maleic acid anhydride. This preferred embodiment of the present invention more preferably does not comprise any further polymeric components although this preferred adhesive in accordance with the present invention may comprise the conventional components, namely additives as identified above. Preferably, as indicated above, the second heterophasic propylene copolymer has a lower ethylene content and also a lower MFR$_2$, compared to the first heterophasic propylene copolymer. Suitable examples are ethylene contents of from 5 to 15-wt %, such as 8 to 12-wt % for the first heterophasic propylene copolymer, while the second heterophasic propylene copolymer comprises, within the ranges as identified above for the first heterophasic propylene copolymer lower amounts of ethylene, such as 5% less of ethylene, in embodiments 10% less of ethylene, in comparison to the first heterophasic propylene copolymer, and in embodiments also more than 10% less of ethylene. Preferably, the MFR$_2$ value of the second heterophasic propylene copolymer is about 50% lower than the MFR$_2$ of the first heterophasic propylene copolymer, such as exemplified in Example 1 according to the present invention.

In accordance with the present invention it is possible to provide an adhesive composition, in particular suitable for pipe applications, showing an increase of peel strength, compared with the prior art compositions, at high temperatures, e.g. at 110 and 140° C. Surprisingly the adhesive compositions of the present invention provide peel strengths, measured in accordance with DIN 30 670, of more than 400 N/cm at 23° C. and still more than 100 N/cm at 140° C. This enables the use of the adhesive composition for applications at high service temperatures, since a sufficient stability of the adhered coating layers can be ensured.

The adhesive composition may be prepared in a usual manner, including blending the individual components using appropriate devices, such as kneaders and extruders.

The adhesive composition in accordance with the present invention may be applied in any desired manner. However, the composition is in particular suitable for coating by extrusion processes, and also for powder coating applications.

The present invention, as outlined above, also provides an article comprising the adhesive composition of the present invention. This article may be any article, including pipes, sheets, cables, films, etc. The adhesive composition in accordance with the present invention is used in these articles preferably as adhesive, in order to improve adhesion and/or compatibility of parts or layers of the article.

In particular the article is a pipe, such as a metal pipe, comprising a multilayer coating of the type described above, i.e. comprising an epoxy primer layer, an adhesive layer and an outer protective polyolefin layer. The adhesive composition of the present invention may be suitably used as the intermediate adhesive layer.

Finally the present invention also provides the use of the adhesive composition as defined herein for the provision of an adhesive layer, in particular an adhesive layer for a three layer coating for pipes, as illustrated above.

EXAMPLES

The following examples illustrate the invention.

Example 1

78.8-wt % of a heterophasic propylene copolymer (10% ethylene content; $MRF_2$ of 4 g/10 min; density 0.904 g/cm$^3$; rubber content: 15%, $C_2$ of rubber: 45%, $MRF_2$ of matrix: 5.5 g/10 min) and 20.0-wt % of maleic acid anhydride modified heterophasic propylene copolymer (9% ethylene content, density 0.906 g/cm$^3$; $MFR_2$ of the polymer before anhydride modification about 1.3 g/10 min; rubber content: 13%, $C_2$ of rubber: 40%, $MRF_2$ of matrix: 1.6 g/10 min and amount of acid grafting: 0.7-wt %) were compounded with 1.2-wt % stabilizing additives. The composition obtained, showing an $MFR_2$ of about 7.5, was used as intermediate adhesive layer in a three layer coating structure on pipes.

Comparative Example 1

23.0-wt % of a mixture of 79-wt % of a heterophasic propylene copolymer (corresponding to the base polymer of the acid anhydride modified heterophasic propylene copolymer used in example 1) and 20-wt % of an LLDPE (FG5190 ethylene-butene copolymer, MFR 1.2) component, subjected to acid anhydride modification (1.0-wt %), were compounded with 56.3-wt % of a heterophasic propylene copolymer corresponding to the base polymer of the acid anhydride modified heterophasic propylene copolymer used in example 1 and 19.5-wt % of EPDM and 1.2-wt % of stabilizing additives. The composition obtained was used as intermediate adhesive layer in a three layer coating structure on pipes. The adhesive composition had a $MFR_2$ of about 3.

Coating experiments were conducted using steel pipes. First a coating of an epoxy primer was applied, by spray coating (rotating steel pipe, 10 m/min, 180-200° C., 100 μm coating thickness). Thereafter an adhesive layer was coextruded with a polypropylene outer layer at temperatures between 220 and 250° C. (layer thickness: adhesive layer 250 μm, outer layer 3.8 mm). Using a silicone pressure roller the coextruded layers were pressed onto the steel pipe in order to increase the adhesion. Using an Instron machine the peel strength was determined. The results are summarized in the following table:

| Peel strength | 23° C. | 80° C. | 110° C. | 140° C. |
|---|---|---|---|---|
| Example 1 | 469 | 282 | 196 | 108 |
| C. Example 1 | 345 | 257 | 158 | 0 |

These results clearly demonstrate the superiority of the coating composition in accordance with the present invention.

Test Methods:

Rubber content: determined as xylene solubles, a weighted polymer sample is placed in xylene at 135° C. in accordance with standard procedures and is stirred for 30 minutes at this temperature, followed by cooling to 25° C. The insoluble part is filtered off, dried and weighted in order to determine the weight of the xylene soluble part.

Acid number: FTIR, the absorbance of peaks from 1800 to 1770 cm$^{-1}$ compared with the base line at 807 cm$^{-1}$ is taken as measure for maleic anhydride content of a given sample. Standard samples are prepared by compounding known amounts of maleic acid anhydride in polypropylene. The amount of maleic acid anhydride in the standards is determined by titration in accordance with standard methods. Acid number is calculated by multiplying the amount of maleic acid anhydride in wt % as determined by FTIR with 5.71. Acid numbers for other acids/anhydrides can be determined in a similar manner, by producing standard samples with the respective acid/anhydride and evaluating the corresponding peaks.

| | |
|---|---|
| Peel strength: | DIN 30670 |
| $MFR_2$: | 230° C., load 2.16 kg, ISO1133 |
| Density: | ISO1183 |
| Comonomer content: | FTIR (calibration $^{13}$C-NMR) |

The invention claimed is:

1. An adhesive composition, comprising a polypropylene component comprising at least one heterophasic propylene copolymer, wherein the adhesive composition has a peel strength at 110° C. of more than 160 N/cm and a value for $MFR_2$ of 5 g/10 min or more, wherein the at least one heterophasic propylene copolymer is present in an amount ranging from 98.0 to 99.5 -wt %, based on the total weight of the adhesive composition.

2. The adhesive composition in accordance with claim 1, wherein the adhesive composition has a value for $MFR_2$ of from 5 to 10 g/10 min.

3. The adhesive composition according to claim 1, wherein the polypropylene component comprises two heterophasic propylene copolymers.

4. The adhesive composition according to claim 1, comprising a single polymeric component.

5. The adhesive composition according to claim 1, wherein the composition has an acid number of below 1.

6. The adhesive composition according to claim 1, wherein the at least one heterophasic propylene copolymer comprises 8 to 12-wt % of ethylene.

7. The adhesive composition according to claim 3, wherein only one of the two heterophasic propylene copolymers has been subjected to acid grafting.

8. An article, comprising the adhesive composition according to claim 1.

9. A method for preparing an adhesive layer comprising incorporating an adhesive composition of claim 1 within the adhesive layer.

* * * * *

UNITED STATES PATENT AND TRADEMARK OFFICE
CERTIFICATE OF CORRECTION

PATENT NO. : 8,481,638 B2  Page 1 of 1
APPLICATION NO. : 12/445135
DATED : July 9, 2013
INVENTOR(S) : Martin Anker et al.

It is certified that error appears in the above-identified patent and that said Letters Patent is hereby corrected as shown below:

Title Page, Item (73):
"Borealis Technology Oy, Porvoo (FI)" should read, --Borealis Technology OY, Porvoo (FI)--.

Signed and Sealed this
First Day of April, 2014

Michelle K. Lee
*Deputy Director of the United States Patent and Trademark Office*